United States Patent [19]
Hava et al.

[11] Patent Number: 6,023,417
[45] Date of Patent: Feb. 8, 2000

[54] GENERALIZED DISCONTINUOUS PULSE WIDTH MODULATOR

[75] Inventors: Ahmet M. Hava, Prospect Heights, Ill.; Russel J. Kerkman, Milwaukee, Wis.

[73] Assignee: Allen-Bradley Company, LLC, Mulwaukee, Wis.

[21] Appl. No.: 09/026,640

[22] Filed: Feb. 20, 1998

[51] Int. Cl.[7] .............................. H02M 1/12; H02P 5/28
[52] U.S. Cl. .................... 363/41; 363/98; 318/811
[58] Field of Search .................... 363/41, 42, 43, 363/98; 318/811, 599

[56] References Cited

U.S. PATENT DOCUMENTS

| | | | |
|---|---|---|---|
| 5,657,216 | 8/1997 | Kaura | 363/41 |
| 5,706,186 | 1/1998 | Blasko | 363/40 |
| 5,811,949 | 9/1998 | Garces | 363/41 |
| 5,850,132 | 12/1998 | Garces | 363/41 |

*Primary Examiner*—Peter S. Wong
*Assistant Examiner*—Rajnikant B. Patel
*Attorney, Agent, or Firm*—Mike A. Jaskolski; John M. Miller; John J. Horn

[57] ABSTRACT

A method and apparatus for selecting one of several different modulating signals for use with a system including a PWM controller and an inverter to generate low frequency alternating voltages on three motor supply lines, modulating signals selected as a function of a modulating index to minimize harmonic distortion in the alternating voltages, minimize switching losses, maximize overall system gain at high modulating index values and maximize the linear range of system operation.

34 Claims, 9 Drawing Sheets

GENERALIZED DISCONTINUOUS PULSE WIDTH MODULATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to pulse width modulated (PWM) voltage conversion and more particularly to an apparatus and/or method for providing different modulating waveforms as a function of a modulation index to achieve linearity between the modulating waveforms and output voltages throughout an extended range of inverter operation with minimal switching losses, minimal harmonic distortion and so as to achieve high overall inverter gain.

Many motor applications require that a motor be driven at various speeds. Motor speed can be adjusted with an adjustable speed drive (ASD) which is placed between a voltage source and an associated motor which can excite the motor at various frequencies. One commonly used type of ASD employs a PWM inverter and associated PWM controller which can control both voltage and frequency of signals that eventually reach motor stator windings.

A typical PWM controller receives three modulating signals, each modulating signal 120 degrees out of phase with the other two modulating signals, and a triangle carrier signal, compares each modulating signal to the carrier signal and generates a plurality of firing signals corresponding to each modulating signal. When a modulating signal is greater than the carrier signal, a corresponding firing signal is high. When a modulating signal is less than the carrier signal, a corresponding firing signal is low.

The firing signals are used to control an associated PWM inverter A PWM inverter consists of a plurality of switches that alternately connect associated motor stator windings to positive and negative DC voltage buses to produce a series of high frequency positive and negative voltage pulses that excite the motor stator windings. By firing the PWM switches according to the firing signals, the widths of the positive pulses relative to the widths of the negative pulses over a series of high frequency pulses varies. The varying widths over a modulating signal period generate a low frequency alternating voltage. When the carrier signal has a high frequency and the maximum magnitude of the modulating signal is less than the magnitude of the DC bus voltage, the generated alternating voltage approximately linearly tracks the modulating signal. Thus, where a modulating signal is sinusoidal, the generated alternating phase voltage is sinusoidal and has a frequency equal to the frequency of the modulating signal.

The phase voltages result in line to line voltages which in turn cause line to line currents which lag the line to line voltages by a phase angle $\Phi$. The generated line to line alternating currents drive the motor which operates at the alternating current frequency. Where the line to line voltages and currents are sinusoidal, the motor is driven smoothly. However, where harmonics occur in the line to line voltages imperfect and inefficient rotation occurs.

For the purposes of this explanation an amplitude modulation index Mi is defined as the ratio of a peak modulation signal value $V_{mp}$ to a function of DC bus voltage such that:

$$Mi=(V_{mp})/((2/\pi)(V_{dc})) \quad \text{Eq. 1}$$

By increasing the index $M_i$, the amplitude of the generated alternating voltage can be increased. In addition, because the generated alternating voltage and associated current track the modulating signal, by changing the frequency of the modulating signal, the frequency of the generated alternating current, and thus the motor speed, can be altered. For example, by increasing the frequency of the modulating signal, the frequency of the alternating current can be increased and motor speed can in turn be increased. Motor speed can be decreased by decreasing the sinusoidal modulating signal frequency.

Several different modulating signal waveforms can be used by a controller to generate firing pulses which result in sinusoidal line to line voltages and line to line currents. Because the modulating signals are 120 degrees out of phase, where the modulating signals are sinusoidal, the line to line voltage across any two stator windings (i.e. between any two inverter outputs) will be sinusoidal. In addition, if precisely the same zero sequence signal is added to three sinusoidal modulating signals which are 120 degrees out of phase, resulting line to line voltages will still be sinusoidal.

Thus, waveform sets which can be used to generate sinusoidal line to line voltages and currents include a first set including three sinusoidal waveforms, one waveform for each inverter phase, each waveform 120 degrees out of phase with the other two waveforms and several other sets of waveforms wherein zero sequence signals are added to three sinusoidal waveforms, each of the three resulting waveforms corresponding to a separate one of the three inverter phases.

Modulating waveforms which generate sinusoidal line to line voltages and currents can generally be divided into two different types including continuous PWM (CPWM) and discontinuous PWM (DPWM) waveforms.

CPWM waveforms, on one hand, are waveforms which are generated with the intention that, during each modulating signal cycle switching occurs each carrier signal cycle. In other words, pulse width modulation is intended to be continuous throughout the modulating signal cycle, hence the term "continuous" PWM. As well known in the art one type of CPWM waveform is the simple sinusoid. In addition, other types of CPWM waveforms can be formed by adding specific zero sequence signals to simple sinusoids.

DPWM waveforms, on the other hand, are waveforms which, during some portion of the modulating signal cycle, are purposefully set equal to the peak carrier signal value so that switching does not occur during at least some carrier signal cycles. In other words, pulse width modulation is discontinuous during each modulating signal cycle, hence the term "discontinuous" PWM. With DPWM signals, during periods when switches in one phase are not switching, modulating signals corresponding to the other two phases are generated such that the resulting line to line voltages remain sinusoidal. DPWM waveforms consist of specific zero sequence signals added to simple sinusoids.

While theoretically an infinite number of zero sequence signals and therefrom CPWM and DPWM modulating signals could be generated, the performance and simplicity constraints of practical PWM-VSI drives reduce possible modulating signals to a small number. For the purposes of the present invention, in addition to SPWM signals, only two other types of CPWM modulating signals will be considered, third harmonic injection PWM (THIPWM) and space vector PWM (SVPWM). THIPWM modulating signals are formed by adding a zero sequence signal to each of three sinusoidal signals where the zero sequence signal is the third harmonic of one of the sinusoidal signals. SVPWM signals are formed by adding a zero sequence signal to each of three sinusoidal signals where the zero sequence signal has a frequency three times that of one of the sinusoidal signals and is a saw tooth signal.

In addition, only two DPWM modulating signals referred to herein as DPWM1 and DPWM2 will be explained.

DPWM1 signals are generated by adding a zero sequence signal to each of three sinusoidal modulating signals where the zero sequence signal has an instantaneous magnitude equal to the magnitude of the difference between a peak carrier signal value and the instantaneous maximum modulating signal magnitude and has the sign of the instantaneous maximum modulating signal. DPWM2 signals are generated by adding a zero sequence signal to each of three sinusoidal modulating signals where the zero sequence signals are generated by first phase shifting each of the three sinusoidal modulating signals 30° to form shifted signals and then the zero sequence signal has an instantaneous magnitude equal to the magnitude of the difference between a peak carrier signal value and the instantaneous maximum shifted signal magnitude and has the sign of the instantaneous maximum shifted signal. The DPWM2 zero sequence signal is added to each of the original, non-shifted modulating sinusoidal signals to yield the DPWM2 modulating signals.

Clearly SPWM signals are the simplest to understand and to generate. In addition, SPWM generates relatively low harmonic distortion at low Mi values. However, while sinusoidal signals have some advantages, they suffer from at least two important shortcomings. First, where the modulating index Mi exceeds unity (i.e. the peak value of the modulating signal is greater than the peak value of the carrier signal), during extreme high and low portions of the modulating signal, the modulating signal and carrier signal do not intersect and switching is discontinued. During these times, because switching is discontinued, the PWM inverter cannot alter the low frequency alternating voltage to reflect variations in modulating signal amplitude. The inverter is said to be saturated and the relationship between the generated alternating voltage and the modulating signal becomes non-linear. The region of operation starting from the end of linear operation and continuing through the six-step operating point (i.e. where Mi=1.0) is commonly referred to as the overmodulation region. An SPWM linear modulation range ends at a modulating index Mi (as defined in Equation 1) of approximately 0.785.

Second, as PWM inverter switches are opened and closed, PWM inverter output is diminished by conduction and switching losses. These losses are directly related to the duration of switch conducting time and the number of times the modulating and carrier signals intersect respectively. Unfortunately, a sinusoidal modulating signal where the modulating signal does not cause overmodulation intersects the carrier signal the maximum number of times per cycle producing high switching losses.

With an SPWM signal set the linear region of operation can be extended by increasing the amplitude of the modulating signals to compensate for non-linearities. For example, assuming SPWM modulating signals which cause operation in the overmodulation region, if, at a specific operating point, generated alternating signals are 5% less than intended, the amplitudes of the SPWM signals can be increased until the generated alternating signals increase by 5%. This correction may require an increase in modulating signal amplitudes of 10 to 12% for example. Such corrections can be made up until the six-step operating point.

Unfortunately, while correction to eliminate non-linearities in the over modulating region is possible, such correction is often difficult to accurately implement. For example, some controller processors are only equipped to manipulate 8 or 16-bit words. In some cases linear operation up to the six step operating point may require extremely large modulating signal amplitude (i.e. 100 or more times greater than the carrier signal value). In these cases processor word handling limitations can adversely affect modulating signal resolution and therefore can affect control accuracy generally. This in turn can cause excessive harmonics at high Mi values where resolution is most distorted.

Other CPWM signals minimize at least some of the shortcomings of SPWM signals. For example, THIPWM signals extends the linear operating region to approximately Mi=0.88 and SVPWM signals extend the linear operating region to approximately Mi=0.9078. In addition, each of the THIPWM and SVPWM signals causes less harmonic distortion than SPWM signals at higher Mi values. Moreover, both THIPWM and SVPWM increase the maximum possible generated alternating voltage prior to saturation.

However, each of the THIPWM and SVPWM signals still causes relatively large switching losses as switching occurs each carrier signal cycle. In addition, while each of these signals can be corrected to compensate for non-linearity in the overmodulation region, such correction is difficult to implement due to hardware word processing constraints.

DPWM signals overcome many of the shortcomings associated with CPWM signals generally. For example, because switching is discontinuous during at least some portion of each modulating signal cycle, switching losses are minimized. In addition, one DPWM method (e.g. DPWM1) can be corrected to compensate for non-linearities at high Mi values without reducing resolution and thus extend the region of linear operation. This is because the highest modulation signal value required or possible for DPWM is the peak carrier signal value. Thus, even at the six step operating point, the modulation index Mi is always a relatively small number when DPWM signals are used. In this case, even an 8 or 16-bit hardware constraint does not reduce resolution. Furthermore, it is well known that at high modulation indexes DPWM signals cause less harmonic distortion than CPWM signals.

Among DPWM signals, different DPWM signals have unique advantages. For example, in addition to being related to the number of times a modulating signal and a carrier signal intersect, switching losses are also related to the instantaneous generated alternating current level when a switch switches (i.e. opens or closes), the bus voltage level, and the time required for a switch to occur such that:

$$\text{Switching Losses} = V_{dc} \cdot I_f \cdot T_{switch} \qquad \text{Eq. 2}$$

where $I_f$ is the instantaneous generated alternating current and $T_{switch}$ is the switch time for a particular device. Thus, DPWM signals which are equal to the peak carrier signal value during periods when the generated alternating current is highest cause less switching losses and therefore cause less harmonic distortion than DPWM signals which are tied to the peak carrier signal value during some other period (e.g. during peak modulating signal periods).

Unfortunately, at low modulation index values Mi, DPWM signals generally cause greater harmonic distortion than CPWM signals. This is because, while DPWM signals are formed by adding a common mode zero sequence signal to balanced three phase modulating signals thus preserving the line to line sinusoidal voltages, the PWM controller modifies the modulating signals as a function of the zero sequence signals on a per carrier cycle basis to generate modified pulses. The modified pulses produce harmonic distortion.

Thus, it would be advantageous to have a method and/or apparatus for providing modulating signals to a PWM inverter that achieve linearity throughout an extended range of inverter operation between the modulating signals and output voltages with minimal switching losses, minimal harmonic distortion and so as to achieve high overall inverter gain.

BRIEF SUMMARY OF THE INVENTION

The present invention includes an apparatus for providing modulating signals which achieve linearity throughout an extended range of inverter operation between the modulating signals and inverter output voltages with minimal switching losses and minimal harmonic distortion and still achieve high overall inverter gain.

It has been recognized that different modulating signals have different operating characteristics at different modulating indexes Mi. In addition, it has been recognized that the operating characteristics of some of the modulating signals are better than the operating characteristics of other modulating signals at low modulating signal values Mi and the operating characteristics of some of the modulating signals are better than the operating characteristics of other modulating signals at high modulating signal values Mi Thus, in its most general form the present invention includes an apparatus which, based on an instantaneous modulating signal Mi, selects one of several different modulating signal sets for generating firing signals to drive a PWM inverter. Thus, when a modulating index is less than a threshold index, the selector selects a first modulating signal set known to have advantageous operating characteristics at relatively low modulating index values and when the modulating index Mi is greater than the threshold index the selector selects a second set of modulating signals known to have advantageous operating characteristics at relatively high modulating index values.

Specifically, it is known that CPWM signals cause relatively less harmonic distortion than DPWM signals at low modulation index values and that DPWM signals cause relatively less harmonic distortion at relatively high modulating index values Mi. Thus, according to one aspect of the invention, at low Mi values the invention generates some type of CPWM modulating signals (e.g. SPWM, SVPWM, THIPWM, etc.) and at high Mi values the invention generates DPWM modulating signals (see for example DPWM1 and DPWM2).

One object of the invention is to minimize harmonic distortion generated in phase and line to line voltages and currents. This object is accomplished by, based on an instantaneous modulating index value, selecting modulating signals known to cause minimal harmonic distortion.

Another object is to extend the linear region of PWM operation. To this end, by selecting a DPWM signal set at high modulating index Mi values the linear region of operation is extended past the point achievable using most CPWM signal sets. This is particularly true of the DPWM1 signal set.

One other object is to reduce inverter switching losses. To this end, by selecting a DPWM signal set at high modulating index values Mi switching is discontinuous at high values Mi and thus switching losses are reduced. In addition, because switching losses are related to the amount of current passing through a switch during switching, switching losses can be further reduced by selecting a DPWM signal set wherein per phase switching is generally in phase with high per phase current periods. To this end, a discontinuous PWM signal set can be generated which is generally in phase with high per phase current periods by generating a zero sequence signal to be added to initial sinusoidal modulating signals. To generate the low loss zero sequence signal according to a preferred embodiment of the invention, it is assumed that the phase angle between each initial modulating signal and a corresponding phase current is approximately 30°. Then, the low loss zero sequence signal is identified by phase shifting each initial modulating signal by 30° to generate first, second, and third phase shifted modulating signals which are correlated respectively with first, second third initial modulating signals, identifying the instantaneous maximum modulating signal as a maximum modulating signal, choosing the initial signal which is correlated with the maximum modulating signal as a correlated signal, identifying the instantaneous sign of the correlated signal as a zero sequence sign, subtracting the correlated signal from the DC bus voltage to provide a zero sequence magnitude signal and multiplying the zero sequence sign and magnitude.

In addition, in one preferred embodiment, the threshold index is a first index and there is a second threshold index which is greater than the first index and, when an instantaneous modulating signal is below the first index, the selector selects a CPWM signal set, when the modulating index is between the first and second indexes the selector selects a first DPWM signal set and when the modulating index is above the second index the selector selects a second DPWM signal set wherein the first signal set is known to cause relatively less switching losses than the second signal set when the modulating index is between the first and second indexes and the second DPWM signal set is known to provide higher gain than the first DPWM signal set when the modulating index is greater than the second index.

Thus, one other object is to provide modulating signals which facilitate high inverter gain while still causing low switching losses when possible. To this end, when high gain is not required (i.e. when the modulating index Mi is below the second index) a modulating signal set is selected which causes minimal switching losses. However, when high gain is required (i.e. when the modulating index Mi is above the second index) a signal set is selected which can achieve the required high gain but which might cause additional switching losses.

One other object is to achieve the aforementioned objects with a conventional controller processor without losing signal resolution. To this end, high amplitude modulating signals are not required to cause linear inverter operation. The largest amplitude required is the peak carrier signal value during DPWM generation which is easily achievable using a conventional processor without reducing resolution.

According to another preferred embodiment, to further reduce switching losses, when the instantaneous modulating index exceeds the threshold index or, where there are first and second indexes and the instantaneous modulating index exceeds the first threshold index, a phase angle identifier can be provided for identifying the phase angle between the modulating index and an associated phase current. Then, the DPWM signal set can be selected such that per phase switching is always discontinued during maximum per phase current periods. This embodiment is more precise than the embodiment wherein the phase angle is presumed to be approximately 30° and thus minimizes switching losses to a greater degree.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1b is a graph illustrating firing signals corresponding to the signals of FIG. 1a.

DETAILED DESCRIPTION OF THE INVENTION

In the following description, all "*" superscripts will refer to initial command modulating signals and all "a", "b" and "c" subscripts will refer to signals, lines and components which are related to first, second and third controller and inverter phases, unless the description indicates otherwise.

A. Theory

Figure 1A:
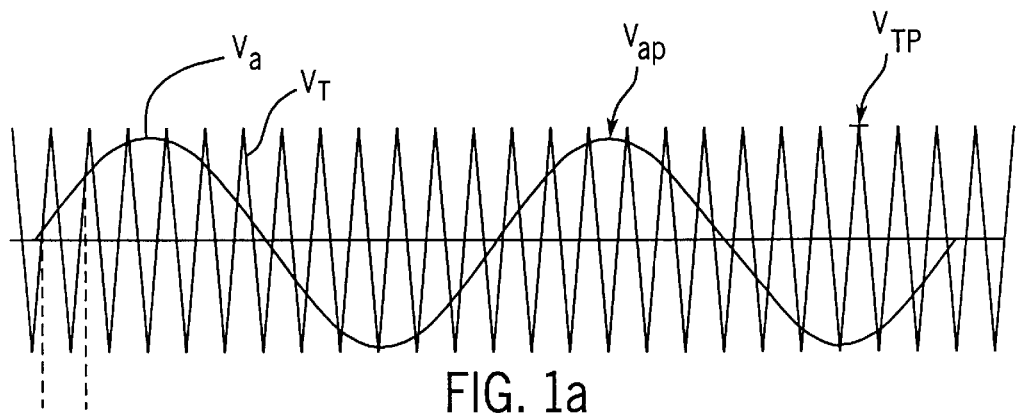
FIG. 1a is a graph illustrating an exemplary carrier signal and a modulating signal.
Figure 1B:
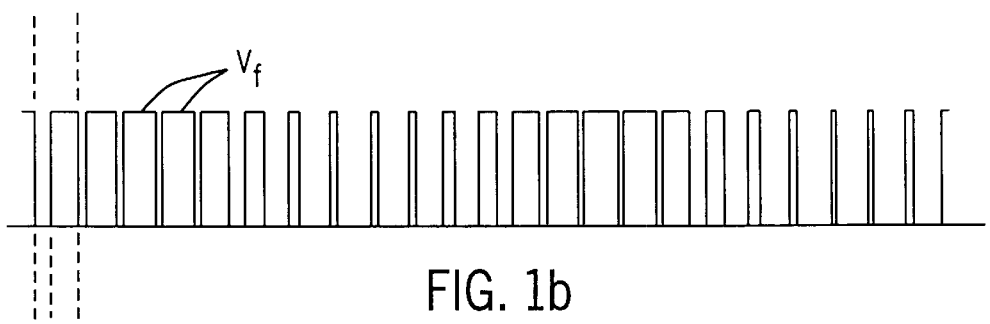
Figure 1C:
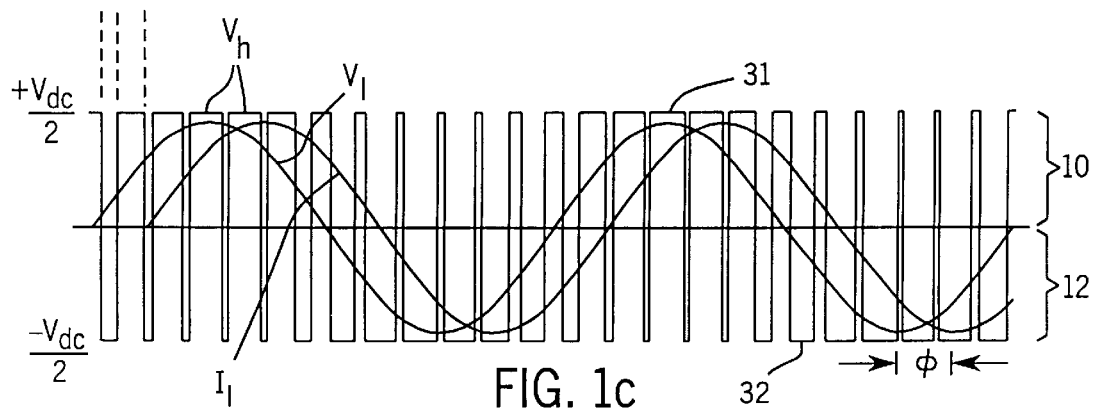
FIG. 1c is a graph illustrating high frequency pulses generated by a PWM inverter controlled by the firing signals of FIG. 1b, a resulting low frequency alternating voltage associated with the high frequency pulses and alternating current caused by the alternating voltage.

Referring to FIGS. 1a through 1c, although only a single modulating signal $V_a$ and signals generated therefrom are illustrated, a three phase PWM inverter for controlling a three phase motor is driven by three such modulating signals, a separate modulating signal corresponding to each of the three motor phases (i.e., each of three motor stator windings). In the interest of simplifying this explanation only one modulating signal $V_a$ and signals generated therefrom are explained here in detail unless some synergy is caused by interphase operation as indicated herein.

Referring specifically to FIGS. 1a and 1b, a PWM controller receives three sinusoidal modulating signals $V_a$ and a carrier signal $V_T$, compares each modulating signal $V_a$ to the carrier signal $V_T$ and generates a firing signal $V_f$ corresponding to each modulating signal $V_a$. When a modulating signal $V_a$ is greater than the carrier signal $V_T$, a corresponding firing signal $V_f$ is high. When a modulating signal $V_a$ is less than the carrier signal $V_T$, a corresponding firing signal $V_f$ is low. For the purposes of this explanation, it will be assumed that the carrier signal has a maximum magnitude or peak carrier value $V_{tp}$ of one (i.e. maximum amplitude is ±1.0).

Firing signals $V_f$ are used to control an associated PWM inverter. A PWM inverter consists of a plurality of switches that alternately connect associated motor stator windings to positive or negative DC voltage buses to produce a series of high frequency voltage pulses that excite the stator windings.

Referring to FIG. 1c, an exemplary sequence of high frequency pulses $V_h$ that an inverter might generate at the machine terminals can be observed along with an exemplary low frequency alternating phase voltage $V_l$. Phase voltage $V_l$ is the fundamental component of the high frequency pulse sequence $V_h$. The high frequency pulses $V_h$ are positive when the firing signal $V_f$ is high and negative when the firing signal $V_f$ is low. The magnitude of each pulse $V_h$ is half the DC potential between the positive and negative DC bus lines. Thus, where the DC potential is $V_{dc}$, the maximum amplitude is $+V_{dc}/2$.
and the minimum magnitude is $-V_{dc}/2$.

By firing the PWM switches according to firing signals $V_f$, the widths of the positive portions 10 of each high frequency pulse relative to the widths of the negative portions 12 over a series of high frequency pulses $V_h$ varies. The varying widths over the period of modulating signal $V_a$ generate the low frequency fundamental component alternating phase voltage $V_l$.

The low frequency phase voltage $V_l$ in turn produces a low frequency alternating phase current $I_l$ that lags the voltage by a phase angle $\Phi$. The phase current $I_l$, drives the motor which operates at the phase current $I_l$ frequency.

By changing the frequency of the modulating signal $V_a$, the frequency of the phase current $I_l$, and thus the motor speed, can be altered. For example, by increasing the frequency of the sinusoidal command signal $V_a$, the frequency of the phase current $I_l$ can be increased and motor speed can in turn be increased. Motor speed can be decreased by decreasing the modulating signal $V_a$ frequency. In addition, by changing the peak-to-peak magnitude of the sinusoidal command signal $V_a$ while maintaining a constant frequency, the amplitude of the fundamental component phase voltage $V_l$ can be altered.

Figure 2:
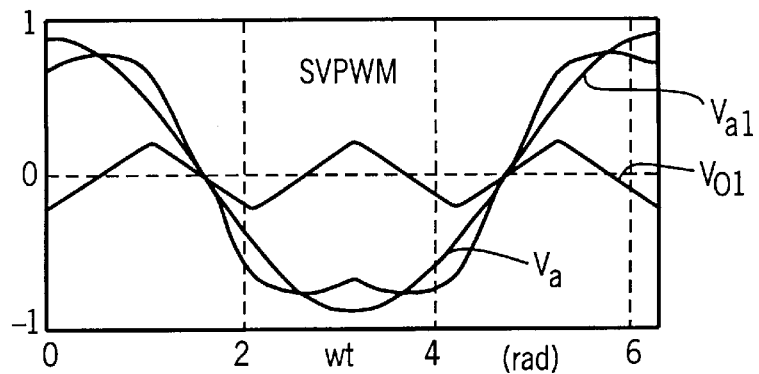
FIG. 2 is a graph illustrating a sinusoidal modulating signal, a space vector zero sequence signal and an SVPWM modulating signal.
Figure 3:
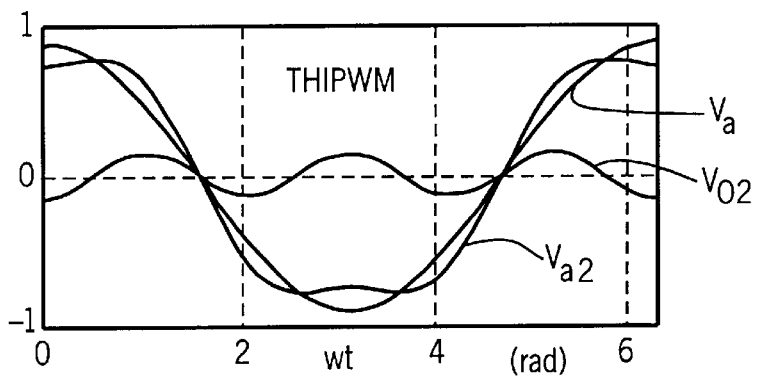
FIG. 3 is similar to FIG. 2, albeit illustrating a third harmonic injection zero sequence signal and an associated THIPWM modulating signal.
Figure 4:
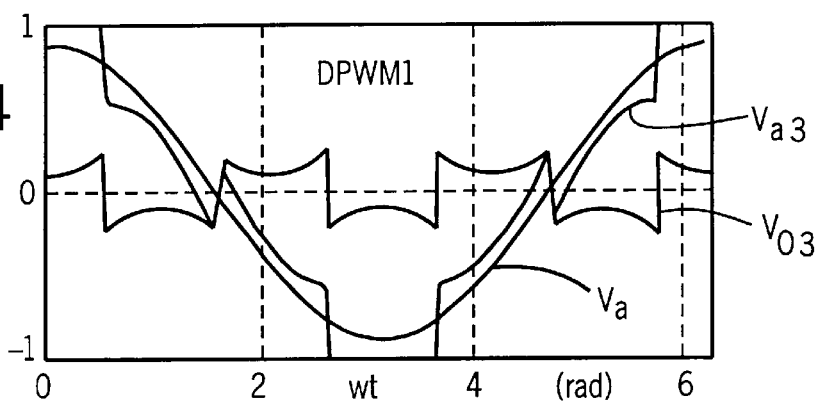
FIG. 4 is similar to FIG. 2, albeit illustrating a first type discontinuous pulse width modulating zero sequence signal and an associated DPWM1 modulating signal.
Figure 5:
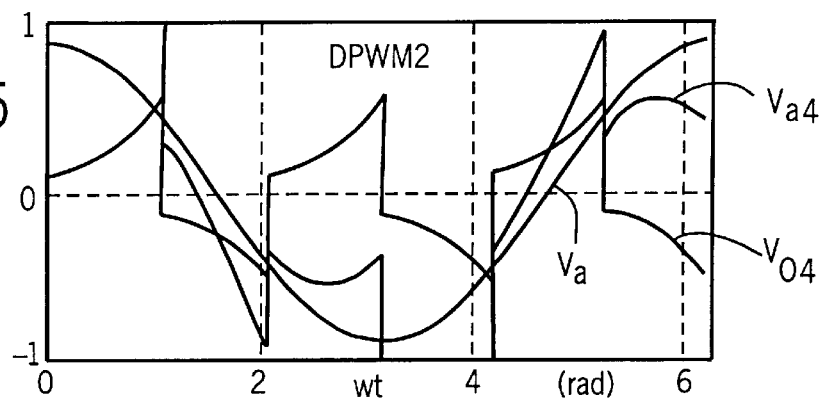
FIG. 5 is similar to FIG. 2, albeit illustrating a second type discontinuous pulse width modulating zero sequence signal and an associated DPWM2 modulating signal.

Referring still to FIG. 1a, modulating signal $V_a$ is a sinusoidal PWM (SPWM) modulating signal. In FIGS. 2 through 5 four common mode zero sequence signals $V_{01}$, $V_{02}$, $V_{03}$ and $V_{04}$ and four other modulating signals $V_{a1}$, $V_{a2}$, $V_{a3}$ and $V_{a4}$ which result when zero sequence signals $V_{01}$, $V_{02}$, $V_{03}$ and $V_{04}$ are added to a sinusoidal modulating signal like exemplary signal $V_a$ are illustrated. In FIG. 2 an exemplary space vector PWM (SVPWM) signal $V_{a1}$ is illustrated. In FIG. 3 an exemplary third harmonic injection PWM (THIPWM) signal $V_{a2}$ is illustrated. In FIG. 4 an exemplary first type discontinuous PWM (DPWM1) signal $V_{a3}$ is illustrated. In FIG. 5 an exemplary second type discontinuous PWM (DPWM2) signal $V_{a4}$ is illustrated.

Referring still to FIGS. 1a and 2 through 5, instead of providing sinusoidal modulating signals $V_a$ for comparison to carrier signal $V_T$, any of modulating signals $V_{a1}$, $V_{a2}$, $V_{a3}$ and $V_{a4}$ may be provided. As explained above, depending on the value of an instantaneous modulating signal, there is usually one modulating signal type $V_a$, $V_{a1}$, $V_{a2}$, $V_{a3}$ or $V_{a4}$ which generates line to line voltages having optimal characteristics.

Figure 6:
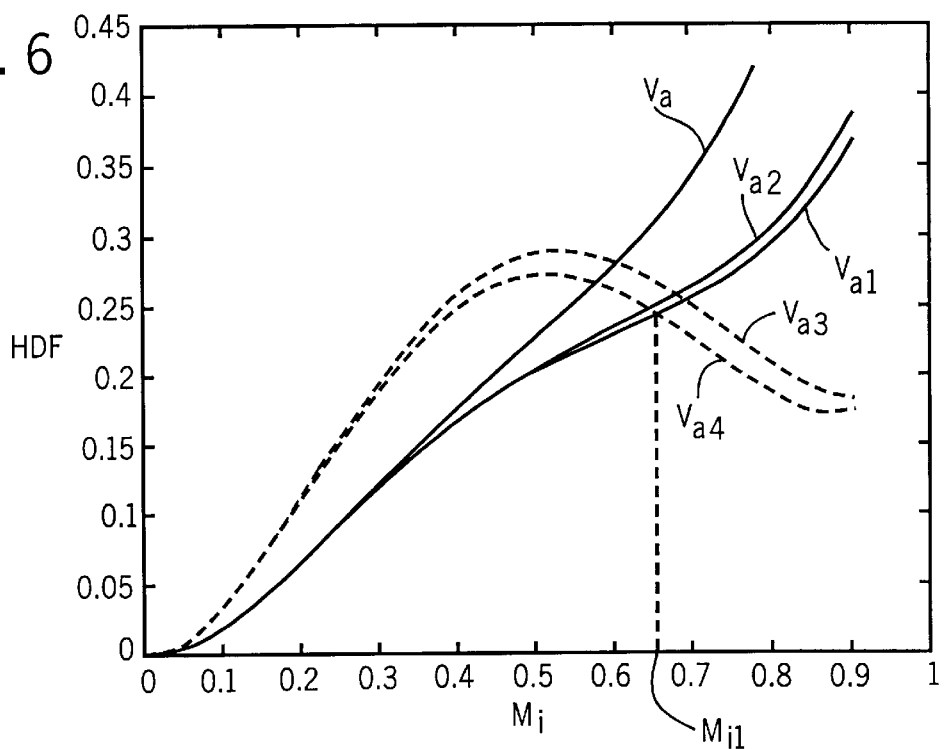
FIG. 6 is a graph illustrating a harmonic distortion factor (HDF) as a function of modulating index $M_i$ for each of the modulating signals illustrated in FIGS. 1a, 2, 3, 4 and 5.

For example, referring also to FIG. 6, therein a separate curve is provided for each of modulating signals $V_a$, $V_{a1}$, $V_{a2}$, $V_{a3}$ and $V_{a4}$ which illustrates a harmonic distortion factor HDF as a function of modulating index Mi (see also Equation 1). Clearly, the amount of harmonic distortion caused by each of signals $V_a$, $V_{a1}$, $V_{a2}$, $V_{a3}$ and $V_{a4}$ is dependent on the value of index Mi. In addition, clearly, certain of signals $V_a$, $V_{a1}$, $V_{a2}$, $V_{a3}$ and $V_{a4}$ cause greater distortion than others at relatively low Mi values and other signals cause greater distortion at relatively high Mi values. Specifically, each of signals SVPWM and THIPWM (i.e. $V_{a1}$ and $V_{a2}$) causes relatively less harmonic distortion at modulating indexes Mi below a first threshold index $M_{il}$ of approximately 0.65 and each of signals DPWM1 and DPWM2 (i.e. $V_{a3}$ and $V_{a4}$) causes relatively less harmonic distortion at modulating indexes above approximately 0.65.

Thus, all other things being equal, according to the present invention, when an instantaneous modulating index Mi is below approximately 0.65, modulating signals of either the SVPWM or THIPWM type are provided to minimize harmonic distortion and when the instantaneous modulating index Mi is above threshold index $M_{i1}$ of approximately 0.65 modulating signals of either the DPWM1 or DPWM2 type are provided to minimize distortion.

In addition to minimizing harmonic distortion by providing SVPWM (or THIPWM) and DPWM modulating signals above and below an instantaneous modulating index Mi of approximately 0.65, respectively, such selection also results in more efficient inverter operation as DPWM modulating signals are known to cause less switching losses than any type of CPWM modulation signals. Furthermore, referring also to FIG. 7, therein a separate curve is provided for each of the DPWM modulating signals $V_{a3}$ and $V_{a4}$ which illustrates a switch loss factor SLF as a function of the voltage—current phase angle $\Phi$. As can be seen, for any phase angle between approximately 18° and 90° modulating signals of the second DPWM type (i.e. DPWM2) corresponding to curve $V_{a4}$ cause relatively less switching losses than modulating signals of the first DPWM type (i.e. DPWM1) corresponding to curve $V_{a3}$. In most cases phase angles will be between 18 and 90°.

Figure 7:
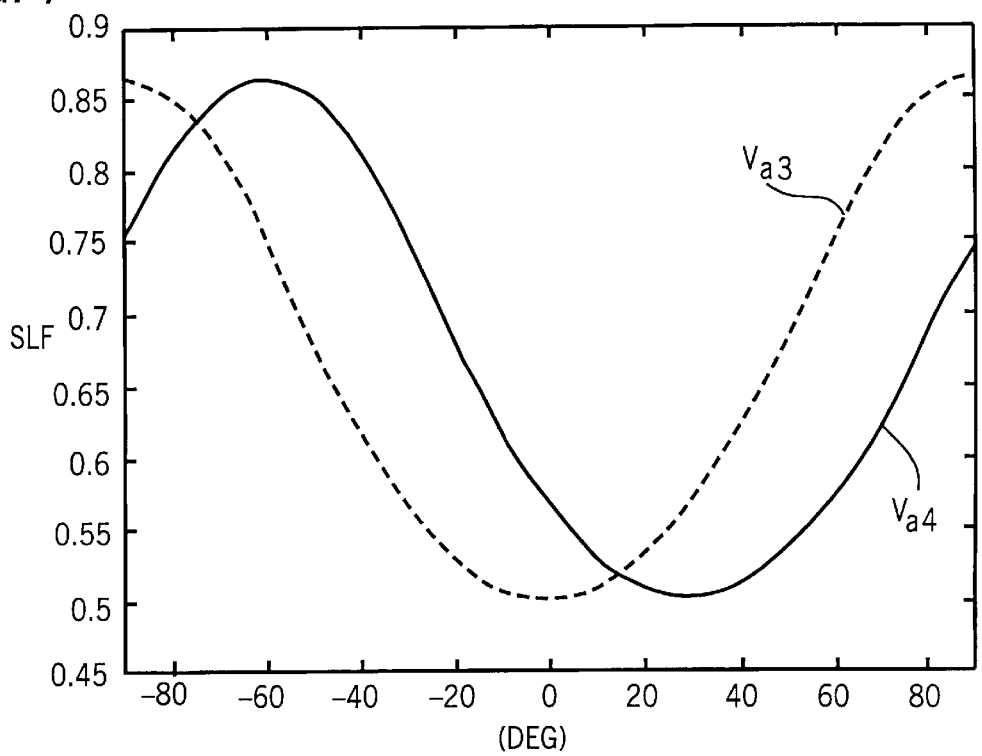
FIG. 7 is a graph illustrating a switch loss factor (SLF) as a function of phase angle $\Phi$ for each of the modulating signals illustrated in FIGS. 4 and 5.

Thus, preferably, given harmonic distortion and SLFs as illustrated in FIGS. 6 and 7, at modulating index values below approximately 0.65 either SVPWM or THIPWM modulating signals (i.e. $V_{a1}$ or $V_{a2}$) should be selected so that in the low modulating index range harmonic distortion is minimized. In addition, above approximately modulating index 0.65, to minimize switching losses and harmonic distortion second type DPWM modulating signals DPWM2 corresponding to curve $V_{a4}$ should be selected.

Figure 8:
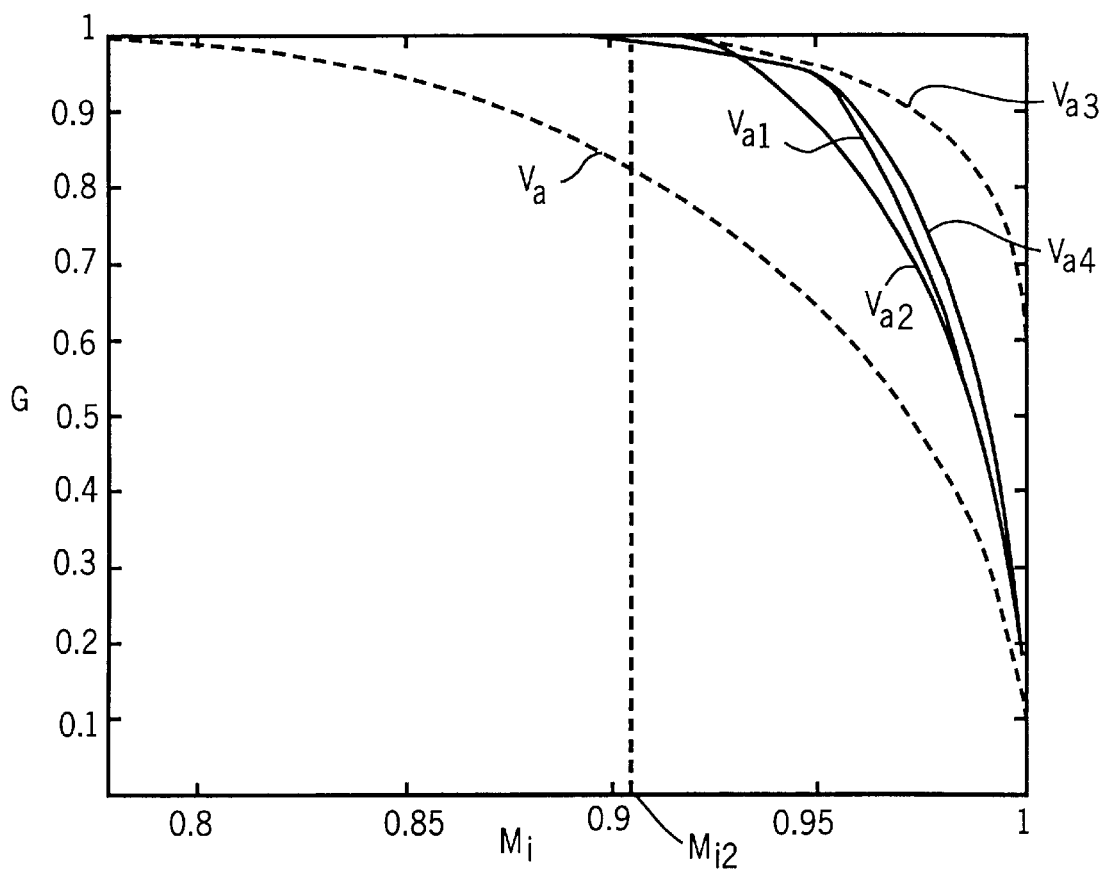
FIG. 8 is a graph illustrating gain (G) as a function of modulating index $M_i$ for each of the modulating signals in FIGS. 1a, 2, 3, 4 and 5.

Above threshold index $M_{il}$=0.65 other modulating index gradations can be made which can be used as a key to further select one of the different types of DPWM signals to advantageously affect voltage and current generation. For example, referring also to FIG. 8, therein a separate curve is provided for each of modulating signals $V_a$, $V_{a1}$, $V_{a2}$, $V_{a3}$ and $V_{a4}$ which illustrates a gain factor G as a function of modulating index Mi. As can be seen, modulating signals $V_a$ cause relatively poor gain, signals $V_{a1}$, $V_{a2}$, $V_{a4}$ cause relatively mediocre gain and modulating signals $V_{a3}$ cause exceptional gain. In addition, it should be recognized that up to a modulating index $Mi_2$ of approximately 0.91 both signals $V_{a3}$ and $V_{a4}$ provide approximately identical gain.

While modulating signals $V_{a4}$ cause less switching losses than modulating signals $V_{a3}$ even above a modulation index $M_i$ of 0.91, overall inverter output voltage linearity as indicated by gain G is relatively greater for modulating signals $V_{a3}$ in this range of operation. In other words, the increase in gain G for using signals $V_{a3}$ instead of using signals $V_{a4}$ is greater than the additional switching losses. Thus, in order to achieve maximum inverter efficiency at all modulating index values, up to a modulating index $M_i$ of approximately 0.91 DPWM2 modulating signals $V_{a4}$ are provided and thereafter DPWM1 signals $V_{a3}$ are provided.

In summary, at least two different modulating index thresholds $M_{i1}$ and $M_{i2}$ can be empirically identified or mathematically developed (mathematical development is not described herein) which divide inverter operation into three separate regions of operation. Below threshold $M_{i1}$ is a low harmonic distortion region, between threshold $M_{i1}$ and $M_{i2}$ is a low switching loss region and above threshold $M_{i2}$ is a high gain region. When an instantaneous modulating index is below threshold Mil CPWM (e.g. SVPWM or THIPWM) signals are generated for comparison to a carrier signal. When the instantaneous modulating index $M_i$ is between thresholds $M_{i1}$ and $M_{i2}$ second type DPWM (i.e. DPWM2) signals are generated for comparison to a carrier signal. When the instantaneous modulating signal $M_i$ is above threshold $M_{i2}$, first type DPWM (i.e. DPWM1) signals are generated for comparison to a carrier signal. Preferred thresholds $M_{i1}$ and $M_{i2}$ are approximately 0.65 and 0.91 although they may be any other suitable values which meet or substantially achieve the intended criteria.

B. Hardware

Figure 9:
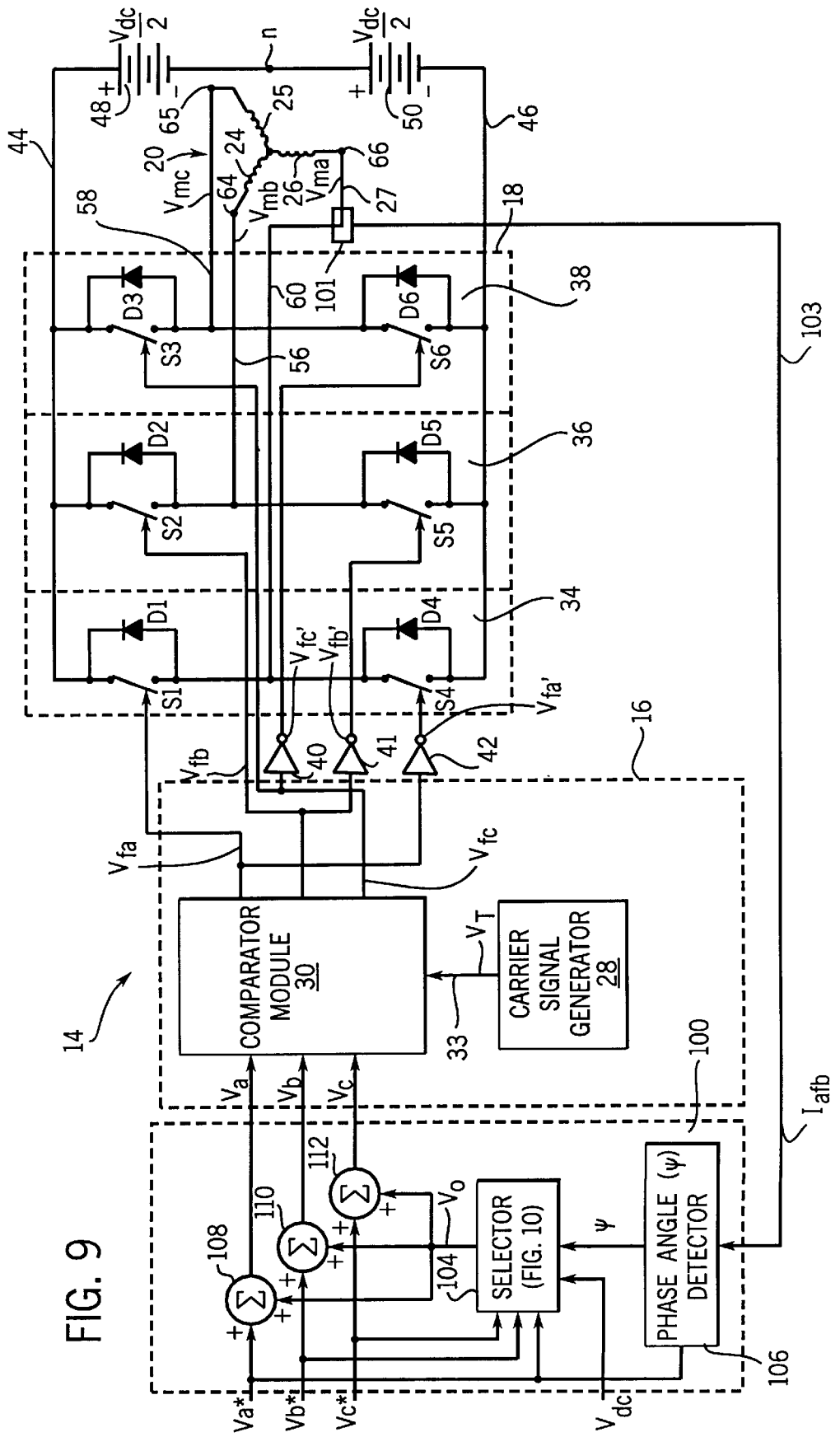
FIG. 9 is a schematic diagram of a motor control system according to the present invention.

Referring to FIG. 9, the present invention will be described in the context of an exemplary motor control system 14 including a PWM controller 16, a PWM inverter 18 and a modulating signal modifier 100. Controller 16 includes a carrier wave signal generator 28 and a comparator module 30. Referring also to FIG. 1a, generator 28 produces carrier signal $V_T$ which is provided to comparator module 30 along line 33. In addition, the comparator module 30 receives three modified modulating signals $V_a$, $V_b$, $V_c$ (only one modulating signal $V_a$ is illustrated in FIG. 1). Module 30 compares each of the three references signals $V_a$, $V_b$, $V_c$ to signal $V_T$ and produces three firing signals $V_{fa}$, $V_{fb}$, $V_{fc}$. Referring also to FIG. 1b, where a modulating signal $V_a$, $V_b$, $V_c$ is greater than the carrier signal $V_T$, module 30 produces a corresponding firing signal $V_{fa}$, $V_{fb}$, $V_{fc}$ which is "high". Where a modulating signal $V_a$, $V_b$, $V_c$ is less than carrier signal $V_T$, module 30 produces a corresponding firing signal $V_{fa}$, $V_{fb}$, $V_{fc}$ which is "low". Thus, three pulsating firing signals $V_{fa}$, $V_{fb}$, $V_{fc}$, are produced that vary in width according to the amplitude of associated modulating signals $V_a$, $V_b$, $V_c$. Signals $V_{fa}$, $V_{fb}$, $V_{fc}$ are provided to PWM inverter 18.

Inverter 18 includes three pairs of switches S1–S6 (BJT, GTO, IGBT or other transistor technology may be used). Each pair includes an upper switch S1, S2, S3 and a lower switch S4, S5, S6, and each pair is arranged as one of three parallel legs 34, 36, 38, connecting positive and negative DC buses 44, 46 respectively. Each switch S1–S6 is coupled with an inverse parallel connected diode D1–D6. Such diodes and their function are well known in the art. A separate three phase winding 24, 25, 26 is electrically connected at one end between the switches S1–S6 in each leg 34, 36, 38 via lines 56, 58 and 60.

Each firing signal $V_{fa}$, $V_{fb}$, $V_{fc}$ is provided to one of the upper switches S1, S2, S3. In addition, each firing signal $V_{fa}$, $V_{fb}$, $V_{fc}$ is inverted by a separate inverter 40, 41, 42 producing inverted firing signals $V_{fa}'$, $V_{fb}'$, $V_{fc}'$. Each inverted firing signal $V_{fa}'$, $V_{fb}'$, $V_{fc}'$ is provided to a separate one of the lower switches S4, S5, S6.

When the inverter switches S1–S6 are controlled by the firing and inverted firing signals, as an upper switch S1, S2, or S3 goes high, a corresponding lower switch S4, S5, or S6 goes low. When an upper switch goes low, a corresponding lower switch in the same leg goes high. In reality, switching sequences are more complicated than described herein due to switching delays provided to eliminate the possibility of a short across positive and negative DC rails. In addition, to compensate for the effect of delays on stator voltages and currents, various "dead time" pulse correction techniques have been developed. While these pulse modification are important, they are well known in the controls industry and, in order to simplify this explanation, will not be described here in detail.

A DC voltage source connects the positive and negative DC busses 44, 46. For the purpose of this description, the DC source can be thought of as consisting of both positive and negative series arranged DC sources 48, 50 respectively, that connect the positive and negative DC buses 44, 46. The positive terminal of the positive source 48 is connected to the positive DC bus 44 and its negative terminal is connected at a node n to the positive terminal of the negative DC source 50. The negative terminal of the negative DC source 50 is connected to the negative DC bus 46. Both DC voltage sources 48, 50 produce potentials of identical magnitude but of opposite signs with respect to central point n on the DC voltage source.

Because each of the three inverter legs 34, 36, 38 operate in the same manner, in order to simplify this explanation, operation of leg 34 and components related thereto will be explained here.

Referring to FIGS. 1b and 1c, when the firing signal $V_{fa}$ is received by the inverter 18, the signal $V_{fa}$ is directed to the first switch S1 whereas the corresponding inverted signal $V_{fa}'$ is directed to the other switch S4 in leg 34. When firing signal $V_{fa}$ is high and $V_{fa}'$ is low, the first switch S1 is closed and the fourth switch S4 is opened. In this state, stator winding 26 is connected through line 27 and the first switch S1 to the positive DC bus 44. This produces a positive DC voltage pulse 31 at stator winding 26. This positive pulse 31 has an amplitude equal to the magnitude of the positive DC voltage source 48 (i.e. $+V_{dc}/2$. and a width equal to the width of the firing signal $V_{fa}$.

When the firing signal $V_{fa}$ goes low, the inverted firing signal goes high. During this time, firing signal $V_{fa}$ opens the first switch S1 and the inverted firing signal $V_{fa}'$ closes the fourth switch S4. This disconnects stator winding 26 from the positive DC bus 44 and shortly thereafter connects the stator winding 26, through line 27 and the fourth switch S4, to the negative DC bus 46. When so connected, a negative DC pulse 32 is generated between central node n and node 66 having an amplitude equal to the magnitude of the negative DC voltage source 50 (i.e. $-V_{dc}/2$. and a width equal to the width of the space between firing signal $V_{fa}$ pulses.

By changing the widths of the positive DC pulses 31 with respect to the widths of the negative DC pulses 32 rapidly over time, a changing average voltage or low frequency alternating voltage $V_l$ which follows the command voltage $V_a$ can be provided across the stator winding 26. This alternating voltage $V_l$ gives rise to an alternating current $I_l$ which lags the voltage by phase angle $\Phi$.

Referring still to FIG. 9, modifier 100 receives three initial modulating signals $V_a^*$, $V_b^*$, and $V_c^*$, and a DC bus voltage signal $V_{dc}$, and uses those signals to generate modified modulating signals $V_a$, $V_b$, $V_c$ which cause low harmonic distortion, low switching losses, high gain and achieve a maximum linear modulation range. To this end, according to a first preferred embodiment of the invention, modifier 100 includes a PWM selector 104 and first, second and third summers 108, 110 and 112, respectively. Note that while a phase angle detector 106 is also illustrated in FIG. 9, detector 106 is not needed for this first embodiment of the invention and is only illustrated for the purpose of explaining a second preferred embodiment.

Figure 10:
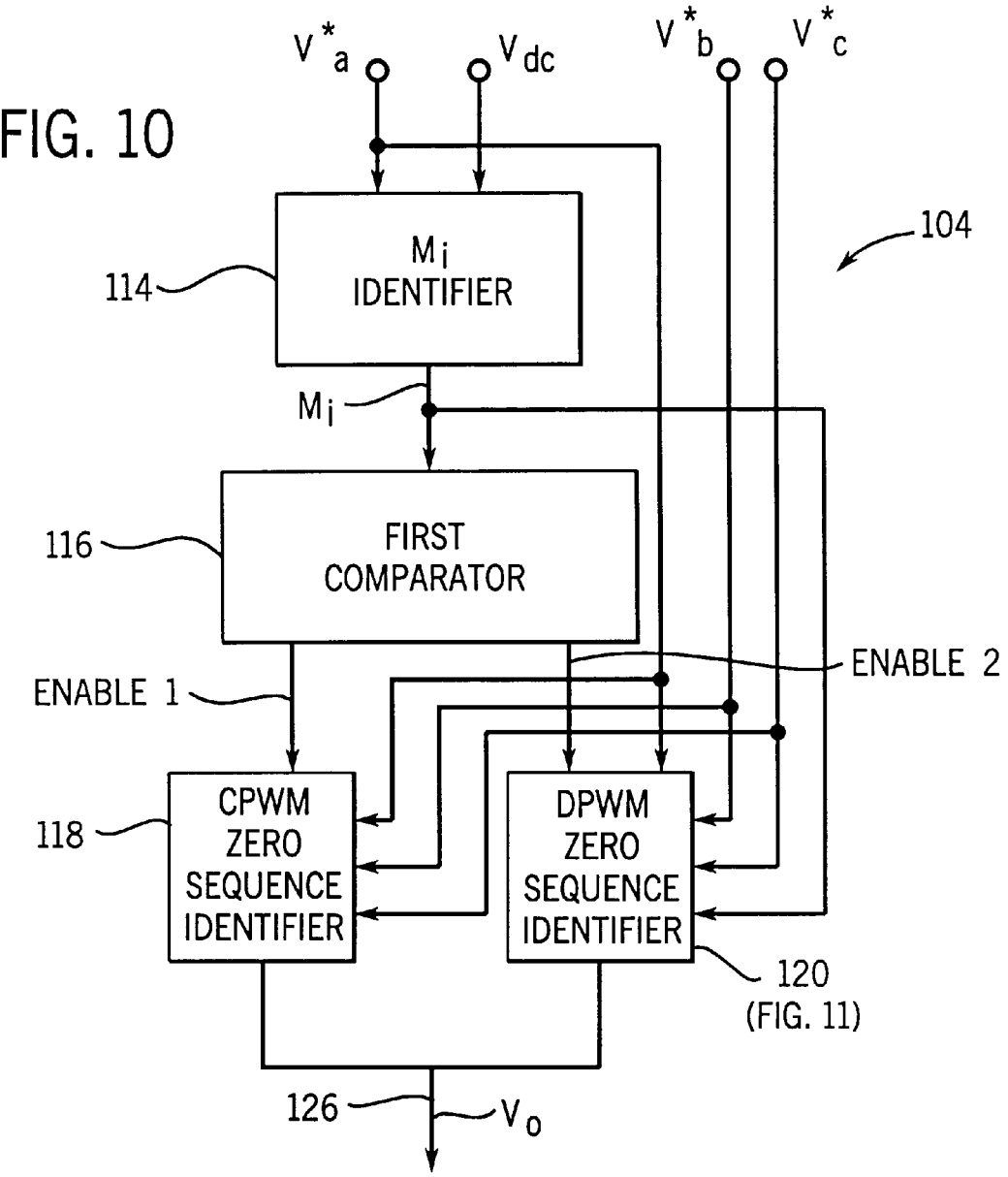
FIG. 10 is a schematic diagram of the selector of FIG. 9.

Referring also to FIG. 10, selector 104 receives initial modulating signals $V_a^*$, $V_b^*$, and $V_c^*$, and DC voltage signal $V_{dc}$ and uses those signals to identify a zero sequence signal $V_o$ to be added to each of command signals $V_a^*$, $V_b^*$, and $V_c^*$ to generate optimal modified modulating signals $V_a$, $V_b$, $V_c$. To this end, selector 104 includes a modulating index identifier 114, a first comparator 116 and CPWM and DPWM zero sequence identifiers 118, 120, respectively.

Identifier 114 receives both command modulating signal $V_a^*$ and DC voltage signal $V_{dc}$ and uses those two signals to identify an instantaneous modulating index $M_i$. To this end, identifier 114 solves Equation 1 above. Modulating index $M_i$ is provided to first comparator 116.

Figure 12:
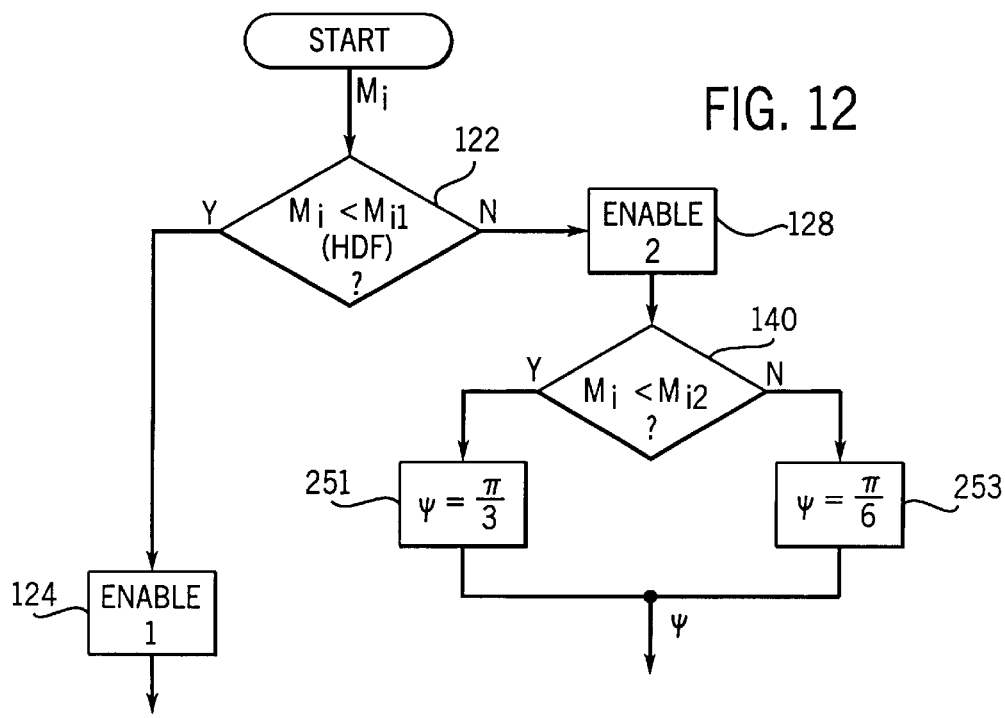
FIG. 12 is a flow chart illustrating operation of a portion of the inventive apparatus.

Referring also to FIGS. 10 and 12, a decision-making process which is partially implemented by comparator 116 and partially implemented by identifier 120 is illustrated. In particular, when comparator 116 receives instantaneous modulating index $M_i$, at decision block 122 comparator 116 compares instantaneous modulating index $M_i$ to the first threshold index $M_{i1}$. Where modulating index $M_i$ is less than first threshold index $M_{i1}$, at block 124 comparator 116 generates a first enabling signal ENABLE 1.

When signal ENABLE 1 is generated, zero sequence identifier 118 generates a CPWM zero sequence signal. For example, referring again to FIGS. 2 and 3, identifier 118 may generate either zero sequence $V_{01}$ which is an SVPWM zero sequence signal, or in the alternative, may generate zero sequence signal $V_{02}$ which is a THIPWM zero sequence signal. Methods to generate the SVPWM and THIPWM zero sequence signals are described in an article entitled *Simple Analytical and Graphical Tools for Carrier Based PWM Methods* written my Ahmet M. Hava, Russel J. Kerkman and Thomas A. Lipo which was published in IEEE-IAS Conference Record, 1997, pp. 1462–1471 and is incorporated herein by reference. The selected zero sequence signal $V_{01}$ or $V_{02}$ are output as zero sequence signal $V_0$ on line 126.

Figure 11:
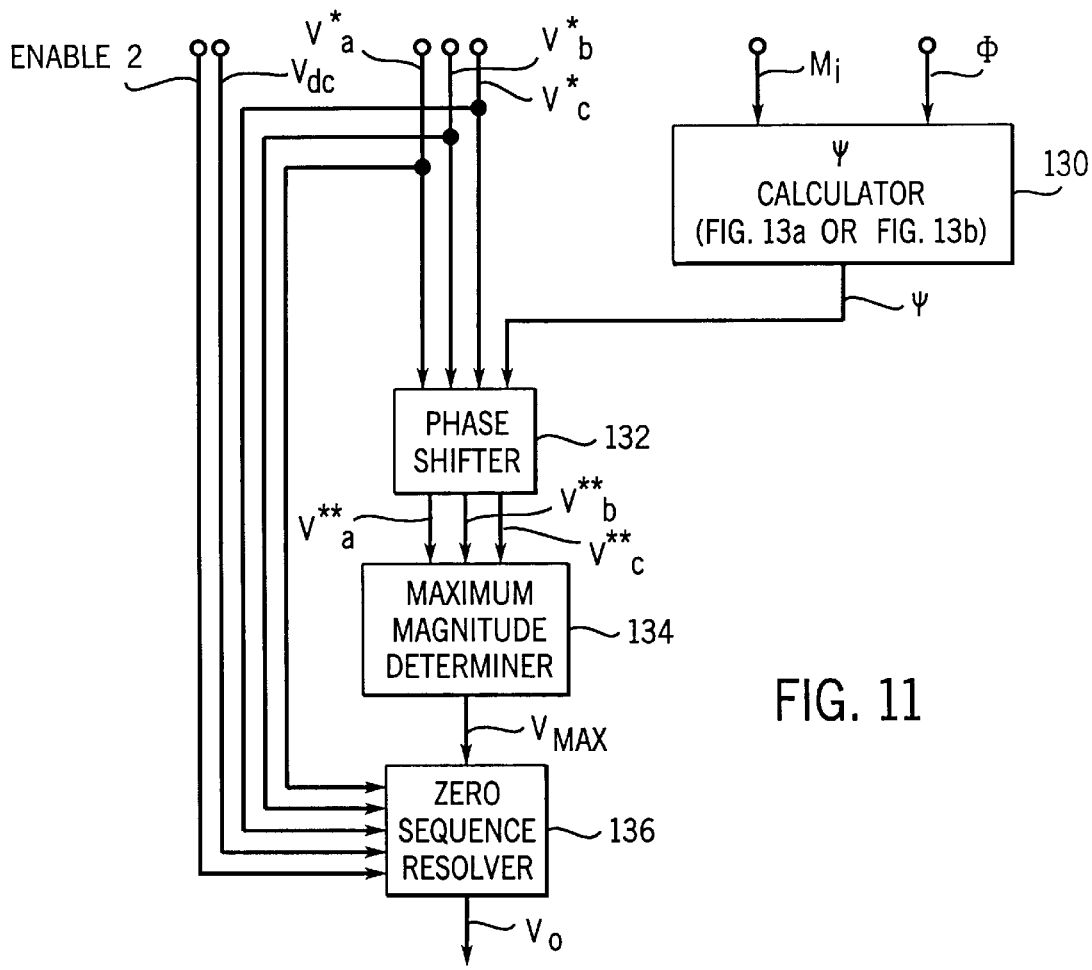
FIG. 11 is a schematic diagram of the DPWM zero sequence identifier of FIG. 10.
Figure 13A:
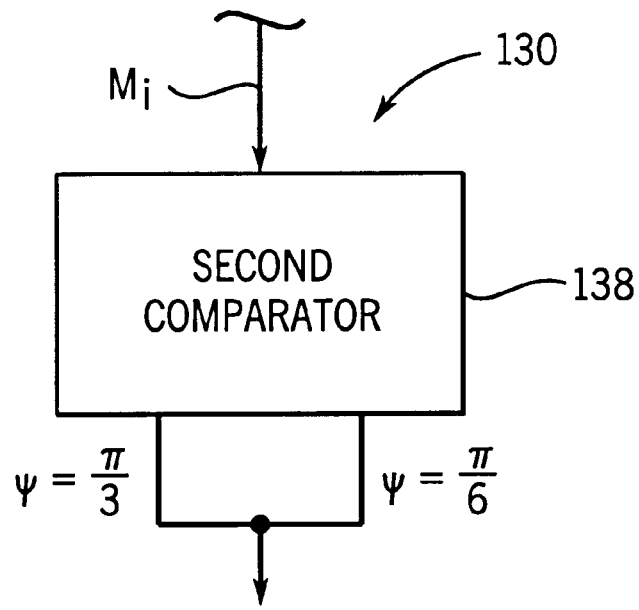
FIG. 13a is a block diagram illustrating the angle calculator of FIG. 11 according to a first preferred embodiment.

Referring still to FIGS. 10 and 12, when the instantaneous modulating index $M_i$ is greater than first threshold index $M_{i1}$, at block 128 comparator 116 generates a second enable signal ENABLE 2. DPWM zero sequence identifier 120 receives enable signal ENABLE 2, each of the three initial modulating signals $V_a^*$, $V_b^*$, and $V_c^*$ and the instantaneous modulating index $M_i$. Referring now to FIG. 11, sequence identifier 120 includes a shift angle calculator 130, a phase shifter 132, a maximum magnitude determiner 134 and a zero sequence resolver 136. Note that while calculator 120 is illustrated as receiving both index $M_i$ and angle $\Phi$, angle $\Phi$ is not needed for this first embodiment and is only shown for the purpose of explaining a second preferred embodiment below. Referring also to FIG. 13a, shift angle calculator 130 in this first preferred embodiment includes a second comparator 138. Referring also to FIG. 12, at decision block 140, comparator 138 compares instantaneous modulating index $M_i$ to second threshold index $M_{i2}$. Where instantaneous modulating index $M_i$ is less than the second threshold index $M_{i2}$, comparator 138 generates a shift angle $\psi$ equal to $\pi/3$ at block 251. However, where the instantaneous modulating index $M_i$ is greater than the second threshold index $M_{i2}$ comparator 138 sets shift angle $\psi$ equal to $\pi/6$ at block 253.

Referring again to FIG. 11, phase shifter 132 receives shift angle $\psi$ and all three initial modulating signals $V_a^*$, $V_b^*$ and $V_c^*$ and shifts each of modulating signals $V_a^*$, $V_b^*$ and $V_c^*$ by $(\psi-\pi/6)$. Thus, where $\psi$ is $\pi/3$, each of modulating signals $V_a^*$, $V_b^*$ and $V_c^*$ is shifted by $\pi/6$ and where $\psi$ is $\pi/6$, none of modulating signals $V_a^*$, $V_b^*$ and $V_c^*$ is shifted (i.e. $\psi-\pi/6=\pi/6-\pi/6=0$). The phase shifted signals are indicated by symbols $V_a^{}$, $V_b^{}$ and $V_c^{**}$.

Referring still to FIG. 11, magnitude determiner 134 receives each of the three phase shifted signals $V_a^{}$, $V_b^{}$ and $V_c^{}$ and performs a maximum magnitude test on the three shifted signals to identify the shifted signal $V_a^{}$, $V_b^{}$ or $V_c^{}$ which has the instantaneous maximum magnitude, outputting a maximum magnitude signal $V_{max}$.

Figure 14:
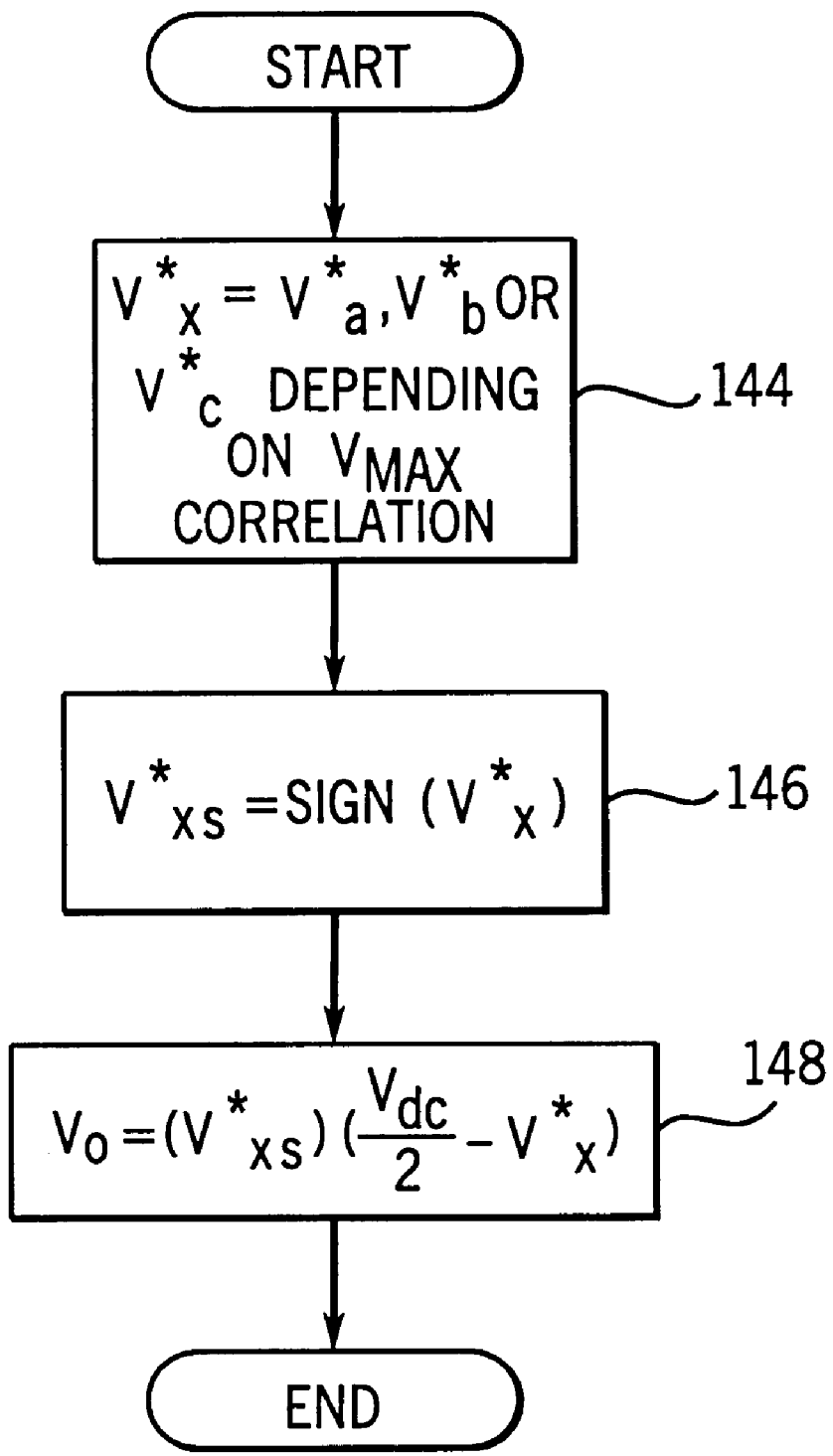
FIG. 14 is a flow chart illustrating operation of the zero sequence resolver of FIG. 11.

Resolver 136 receives maximum magnitude signal $V_{max}$, each of the three initial command modulating signals $V_a^*$, $V_b^*$ and $V_c^*$ and DC voltage signal $V_{dc}$ and uses all of those signal to generate a zero sequence signal $V_0$ when enable signal ENABLE 2 is provided. Referring also to FIG. 14, a flow chart is provided which illustrates operation of resolver 136. Beginning at block 144, resolver 136 correlates maximum magnitude signal $V_{max}$ with one of the initial modulating signals $V_a^*$, $V_b^*$ and $V_c^*$ and sets a correlated modulating signal $V_x^*$ equal to the correlated signal $V_a^*$, $V_b^*$ and $V_c^*$. For example, where maximum magnitude signal $V_{max}$ corresponds to shifted signal $V_a^{}$, resolver 136** correlates maximum magnitude signal $V_{max}$ with initial modulating signal $V_a^*$. Similarly, where maximum magnitude signal corresponds to shifted signal $V_b^{}$ resolver 136** correlates maximum magnitude signal $V_{max}$ with initial modulating signal $V_{b^*}$.

Next, at block 146 resolver 136 determines the instantaneous sign of correlated signal $V_x^*$ and generates a zero sequence sign signal $V_{xs}^*$ indicating the instantaneous sign of signal $V_x^*$. Then, at block 148, resolver 136 determines a zero sequence signal by solving the following equation:

$$V_0 (V_{xs}^*)(V_{dc}/2-V_x^*) \qquad \text{Eq. 3}$$

Zero sequence signal $V_0$ is provided by resolver 136.

Referring again to FIG. 9, zero sequence signal $V_0$ is provided by selector 104 to each of summers 108, 110 and 112. In addition, summer 108 receives initial modulating signal $V_a^*$, summer 110 receives initial modulating signal $V_b^*$ and summer 112 receives initial modulating signal $V_c^*$. Summers 108, 110 and 112 add zero sequence signal $V_0$ to initial modulating signals $V_a^*$, $V_b^*$ and $V_c^*$, respectively, thereby generating modified modulating signals $V_a$, $v_b$ and $V_c$, which are provided to comparator module 30 for comparison to the carrier signal $V_T$.

It should be appreciated that the hardware described above operates to modify initial sinusoidal modulating signals as a function of modulating index $M_i$. For modulating indexes $M_i$ below a first threshold $M_{i1}$ (i.e. $\approx 0.65$), the invention operates to provide continuous PWM modulating signals known to generate low harmonic distortion, for indexes $M_i$ between the first threshold index $M_{i1}$ and the second threshold index $M_{i2}$ (i.e. $\approx 0.91$), the invention operates to provide discontinuous PWM signals $V_{a4}$ known to generate low harmonic distortion and minimize switching losses and for indexes $M_i$ above threshold index $M_{i2}$ the invention provides DPWM signals $V_{a3}$ known to generate low distortion and provide maximum inverter gain.

C. Other Preferred Embodiments

According to a second preferred embodiment, instead of assuming that the phase angle $\psi$ between a modulating signal and an associated phase current is approximately 30° and generating modified modulating signals $V_{a4}$ based on that assumption, phase angle $\psi$ is actually identified and is then used to generate modified modulating signals $V_{a4}$. In this manner, inverter phase switching is discontinued in each phase during the highest per phase current periods such that switching losses are ultimately minimized. In other words, $T_{switch}$ in Equation 2 above is minimized.

With very few exceptions, this second embodiment uses almost all of the hardware described above in the same manner described above, to generate modified modulating signals $V_a$, $v_b$ and $V_c$. For this reason, in order to simplify this explanation, hardware which operates in the same manner will only be described again in a perfunctory manner and only hardware unique to this second embodiment or which operates differently in this second embodiment will be explained here in detail.

Referring again to FIG. 9, this second embodiment, like the first, includes a controller 14, an inverter 18 and a signal modifier 100. In addition, this second embodiment includes a current sensor 101 (e.g. a Hall Effect sensor) linked to line 60 which provides a current feedback signal $I_{afb}$ to modifier 100 indicating the current passing through line 60, line 60 associated with first leg 34 of inverter 18. Inverter 18 and controller 16 are identical to and operate in the same manner in this second embodiment as described above.

Modifier 100, like the modifier described above also includes three summers 108, 110 and 112 and a selector 104. However, in this second embodiment modifier 100 also includes a phase angle $\Omega$ detector 106. Detector 106 receives current feedback signal $I_{afb}$ and command modulating signal $V_a^*$, each of which correspond to inverter leg 34. Using any method known in the art
detector 106 identifies the phase angle $\Phi$ between signals $I_{afb}$ and $V_a^*$ (see FIG. 1(c)). For example, detector can identify consecutive zero crossings of signals $I_{afb}$ and $V_a^*$ and convert the crossings into a phase angle $\Phi$. Angle $\Phi$ is provided to selector 104.

Referring again to FIG. 10, selector 104 includes identifier 114, comparator 116 and identifiers 118 and 120. Identifier 114 determines an instantaneous modulating index $M_i$ as indicated above which is provided to comparator 116. Assuming an instantaneous index $M_i$ less than first threshold index $M_{i1}$, comparator 116 and identifier 118 cooperate to provide one type CPWM zero sequence signals (see $V_{O1}$ and $V_{O2}$ in FIGS. 2 and 3) on line 126.

However, if index $M_i$ is greater than first threshold index $M_{i1}$, identifier 120 is enabled. Referring again to FIG. 11, identifier 120 includes calculator 130, shifter 132, determiner 134 and resolver 136.

Figure 13B:
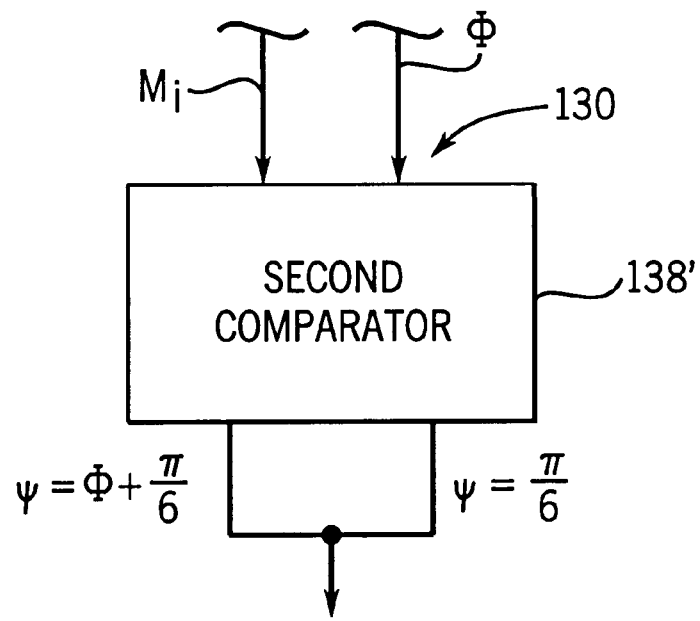
FIG. 13b is a block diagram similar to FIG. 13a, albeit according to a second preferred embodiment.

Calculator 130 receives modulating index $M_i$ and phase angle $\Phi$ from detector 106 and generates a shift angle $\psi$ based thereon. To this end, referring also to FIG. 13b, according to the present invention, a second comparator 138' receives index $M_i$ and angle $\Phi$. Comparator 138' compares index $M_i$ to a second threshold index $M_{i2}$ and, where index $M_i$ is less than second threshold index $M_{i2}$, generates shift angle $\psi$ equal to $\pi/6$. However, where index $M_i$ is greater than second threshold index $M_{i2}$ (i.e. 0.91), comparator 138' generates a shift angel $\psi$ equal to phase angle $\Phi$ less $\pi/6$ (i.e. $\Phi-\pi/6$). For example, assuming index $M_i$ exceeds second threshold index $M_{i2}$, if phase angle $\Phi$ is 15°, comparator 138' would generate shift angle $(15°+\pi/6)$ or 45°. Angle $\psi$ is provided to shifter 132 (see FIG. 11).

Referring to FIG. 11, shifter 132 shifts each of initial modulating signals $V_a^*$, $V_b^*$ and $V_c^*$ by $\psi-\pi/6$) providing shifted signals $V_a^{}$, $V_b^{}$ and $V_c^{}$ to determine 134 which identifies the maximum of signals $V_a^{}$, $V_b^{}$ and $V_c^{}$ as maximum signal $V_{max}$. Resolver 136 receives signal $V_{max}$, correlates signal $V_{max}$ with one of initial signals $V_a^*$, $V_b^*$ and $V_c^*$, the correlated signal being a correlated signal $V_x^*$, determines $V_{xs}^*$ which is the instantaneous sign of signal $V_x^*$ and then determines the zero sequence signal $V_0$ using Equation 3 above.

Referring again to FIG. 9, zero sequence signal $V_0$ is provided to each of summer 108, 110 and 112 and is thereby used to modify signals $V_a^*$, $V_b^*$ and $V_c^*$.

Thus, according to this second embodiment, during the minimal switching loss region of operation where $M_{i1}<M_i<M_{i2}$, each DPWM signal generated causes discontinuous switching in an associated inverter phase during peak phase current periods thereby minimizing switching losses.

It should be understood that the methods and apparatuses described above are only exemplary and do not limit the scope of the invention, and that various modifications could be made by those skilled in the art that would fall under the scope of the invention. For example, while sensor 101 and line 103 have been illustrated in FIG. 9 and are described as part of the inventive second embodiment, where a current regulator is used to drive inverter 18, clearly current is controlled and the regulator could be used instead of a sensor to identify current phase (e.g. zero crossings). In addition, while preferably there are two thresholds which divide system operation into three different ranges including a low harmonic distortion range, a low switching loss range and a high gain range, other embodiments are clearly contemplated wherein only two ranges are separated by a single threshold index. Moreover, thresholds of 0.65 and 0.91 are only exemplary and other threshold are contemplated. Thus, referring again to FIG. 6, where the CPWM signals generated correspond to $V_a$, the first threshold index may be 0.60 instead of 0.65. Furthermore, while DPWM1 and DPWM2 are preferred DPWM signal types and SVPWM and THIPWM and preferred CPWM signals, other DPWM and CPWM signals are contemplated.

To apprise the public of the scope of this invention, We make the following claims:

We claim:

1. An apparatus for use with a PWM controller and inverter, the controller comparing modulating signals to a carrier signal to generate firing signals for turning PWM inverter switches on and off thereby connecting each of first, second and third inverter output lines alternately between positive and negative DC buses and generating high frequency voltage pulses on each output line, the high frequency pulses on each line together generating low frequency alternating voltages, the positive DC bus having a DC bus voltage value, the apparatus for providing modulating signals which cause minimum harmonic distortion in the generated voltages, the controller providing three initial sinusoidal modulating signals, the apparatus comprising:

an identifier which receives at least one of the initial modulating signals and determines a modulating index;

a comparator which compares the modulating index to a threshold index, and a selector which:
when the modulating index is less than the threshold index, provides a first signal set including first, second and third PWM signals corresponding to the first, second and third output lines, the first set having identical 120 degree phase shifted waveforms; and when the modulating index is greater than the threshold index, provides a second signal set including first, second and third PWM signals corresponding to the first, second and third output lines, the second set having identical 120 degree phase shifted waveforms;

wherein, below the threshold index, the first set causes relatively less generated voltage harmonic distortion than the second set and, above the index, the second set causes relatively less generated voltage distortion than the first set.

2. The apparatus of claim 1 wherein the first set includes continuous PWM signals (CPWM).

3. The apparatus of claim 1 wherein the second set includes discontinuous PWM signals (DPWM).

4. The apparatus of claim 2 wherein the CPWM signals are sinusoidal PWM signals (SPWM).

5. The apparatus of claim 2 wherein the CPWM signals are space vector PWM signals (SVPWM).

6. The apparatus of claim 1 wherein the selector generates the second set by mathematically combining a zero sequence signal with each of three initial sinusoidal modulating waveforms, the zero sequence signal determined by mathematically combining at least one of the initial modulating signals with the DC bus voltage value.

7. The apparatus of claim 6 wherein the selector further includes:

a maximum magnitude determiner which receives the three initial sinusoidal modulating signals and identifies the modulating signal having the greatest magnitude as the maximum modulating signal;

a zero sequence resolver which identifies the sign of the maximum modulating signal as the zero sequence sign, subtracts the maximum modulating signal from the DC bus voltage value generating a zero sequence magnitude and multiplies the zero sequence magnitude by the zero sequence sign to generate a zero sequence signal; and a signal modifier which mathematically combines the zero sequence signal and each of the three initial modulating signals generating the second set.

8. The apparatus of claim 7 wherein the modifier mathematically combines by adding the zero sequence signal to each of the three initial modulating signals.

9. The apparatus of claim 1 wherein the threshold index is essentially 0.65.

10. The apparatus of claim 1 wherein a switching loss occurs each time an inverter switch changes state from on to off or vice versa, the apparatus also for limiting switching losses and maximizing inverter gain, the comparator being a first comparator, the threshold index being a first index and the selector being a first selector, the apparatus further including a second comparator and a second selector and there also being a second threshold index, when the modulating index is greater than the first index, the second comparator comparing the modulating index to the second index and, wherein the second selector:

when the modulating index is less than the second index, provides a low loss signal set including first, second and third PWM signals having identical 120 degree phase shifted waveforms corresponding to the first, second and third output lines, respectively; and when the modulating index is greater than the second index, provides a high gain signal set including first, second and third PWM signals having identical 120 degree phase shifted waveforms corresponding to the first, second and third inverter output lines, respectively;

wherein, below the second index, the low loss set is known to cause relatively less switching losses than the high gain set and, above the threshold index, the high gain set is know to cause relatively higher gain than the low loss set.

11. The apparatus of claim 10 wherein the selector generates each second signal set by mathematically combining a zero sequence signal with each of the initial modulating signals, the selector including a zero sequence identifier for identifying the high gain zero sequence signal, the identifier including:

a maximum magnitude determiner which receives the three initial sinusoidal modulating signals and identifies the modulating signal having the greatest magnitude as the maximum modulating signal; and a zero sequence resolver which identifies the sign of the maximum modulating signal as the high gain zero sequence sign and mathematically combines the maximum modulating signal, the DC voltage and the zero sequence sign to generate the high gain zero sequence signal.

12. The apparatus of claim 11 wherein the resolver mathematically combines by subtracting the maximum modulating signal from the DC voltage value to generate a high gain zero sequence magnitude signal and multiplies the high gain zero sequence magnitude signal by the zero sequence sign.

13. The apparatus of claim 10 wherein the selector generates each second signal set by mathematically combining a zero sequence signal with each of the initial modulating signals, the selector including a zero sequence identifier fo identifying the low loss zero sequence signal, the identifier including:

a phase shifter receiving each of the first, second and third initial modulating signals and generating first second and third phase shifted signals by phase shifting the initial signals by a specified phase angle;

a maximum magnitude determiner receiving each of the phase shifted signals and identifying the instantaneous maximum phase shifted signal; and a zero sequence resolver which correlates one of the initial modulating signals with the maximum phase shifted signal, the correlated initial modulating signal being a correlated signal, determines the instantaneous sign of the correlated signal as the low loss zero sequence sign, and mathematically combines the correlated signal, the DC bus voltage and the low loss zero sequence sign to generate the low loss zero sequence signal.

14. The apparatus of claim 13 wherein the resolver mathematically combines by subtracting the correlated signal from the DC voltage value to generate a low loss zero sequence magnitude signal and multiplying the low loss zero sequence magnitude signal by the low loss zero sequence sign.

15. The apparatus of claim 13 wherein the specified phase angle is 30 degrees.

16. The apparatus of claim 10 wherein the first threshold index is substantially 0.65 and the second threshold index is substantially 0.91.

17. The apparatus of claim 10 wherein the controller provides at least one current signal indicating the phase of a current associated with a first of the initial modulating signals, to generate the low loss zero sequence signal, the apparatus further including:

a phase angle determiner using the current signal and the first initial modulating signal to identify the phase angle between the current signal and first initial modulating signal;

a phase shifter receiving each of the first, second and third initial modulating signals and generating first second and third phase shifted signals by phase shifting the initial signals by the phase angle;

a maximum magnitude determiner receiving each of the phase shifted signals and identifying the instantaneous maximum phase shifted signal; and a zero sequence resolver which correlates one of the initial modulating signals with the maximum phase shifted signal, the correlated initial modulating signal being a correlated signal, determines the instantaneous sign of the correlated signal as the low loss zero sequence sign, and mathematically combines the correlated signal, the DC bus voltage and the low loss zero sequence sign to generate the low loss zero sequence signal.

18. The apparatus of claim 17 wherein the resolver mathematically combines subtracting the correlated signal from the DC bus voltage value to generate a low loss zero sequence magnitude signal and multiplying the low loss zero sequence signal by the low loss zero sequence sign.

19. A method for use with a PWM controller and inverter, the controller comparing modulating signals to a carrier signal to generate firing signals for turning PWM inverter switches on and off thereby connecting each of first, second and third inverter output lines alternately between positive and negative DC buses and generating high frequency voltage pulses on each output line, the high frequency pulses on each line together generating low frequency alternating voltages, the controller providing thee initial sinusoidal modulating signals and the DC bus having a DC bus voltage value, the method for providing modulating signals which cause minimum harmonic distortion in the generated voltages, the method comprising the steps of:

determining a modulating index using at least one of the initial modulating signals;

comparing the modulating index to a threshold index; and when the modulating index is less than the threshold index, providing a first signal set including first, second and third PWM signals corresponding to the first, second and third output lines, the first set having identical 120 degree phase shifted waveforms; and when the modulating index is greater than the threshold index, providing a second signal set including first, second and third PWM signals corresponding to the first, second and third output lines, the second set having identical 120 degree phase shifted waveforms; and wherein, the first set is known to cause relatively less harmonic distortion than the second set when the modulating index is less than the threshold index and the second set is known to cause relatively less harmonic distortion than the first set when the modulating index is greater than the threshold index.

20. The method of claim 19 wherein the step of providing the first signal set includes providing continuous PWM signals (CPWM).

21. The method of claim 19 wherein the step of providing the second signal set includes providing discontinuous PWM signals (DPWM).

22. The method of claim 21 also including the step of identifying the second set, the step of identifying further including the steps of:
mathematically combining the at least one of the initial modulating signals with a peak carrier signal to generate a zero sequence signal; and
mathematically combining the zero sequence signal with each of the three initial modulating signals to generate the second set.

23. The method of claim 22 wherein the step of identifying the second set includes the step of identifying the zero sequence signal and the step of identifying the zero sequence signal further includes the steps of:
identifying the modulating signal having the greatest magnitude as the maximum modulating signal;
identifying the sign of the maximum modulating signal as the zero sequence sign;
subtracting the maximum modulating signal from the DC bus voltage value generating a zero sequence magnitude; and
multiplying the zero sequence magnitude by the zero sequence sign to generate a zero sequence signal.

24. The method of claim 7 wherein the step of mathematically combining the zero sequence signal with each of the three initial modulating signals includes adding the zero sequence signal to each of the three initial modulating signals.

25. The method of claim 19 wherein the threshold index is essentially 0.65.

26. The method of claim 19 wherein a switching loss occurs each time an inverter switch changes state from on to off or vice versa, the method also for limiting switching losses and maximizing inverter gain, the threshold index being a first threshold index, the method further including the steps of:
when the modulating index exceeds the first threshold index, comparing the modulating index to a second threshold index;
when the modulating index is less than the second threshold index, providing a low loss signal set including first, second and third PWM signals having identical 120 degree phase shifted waveforms corresponding to the first, second and third output lines, respectively; and
when the modulating index is greater than the second index, providing a high gain signal set including first, second and third PWM signals having identical 120 degree phase shifted waveforms corresponding to the first, second and third inverter output lines, respectively;
wherein, below the second threshold index, the low loss set is known to cause relatively less switching losses than the high gain set and, above the second threshold index, the high gain set is known to cause relatively higher gain than the low loss set.

27. The method of claim 26 wherein the step of providing a high gain signal set includes identifying a high gain zero sequence signal and mathematically combining each of the initial modulating signals with the high gain zero sequence signal and the step of identifying a high gain zero sequence signal includes the steps of:
identifying the initial modulating signal having the greatest instantaneous magnitude as the maximum modulating signal;
identifying the sign of the maximum modulating signal as the high gain zero sequence sign; and
mathematically combining the maximum modulating signal, the DC voltage and the zero sequence sign to generate the high gain zero sequence signal.

28. The method of claim 27 wherein the step of mathematically combines the maximum modulating signal, the DC voltage signal and the zero sequence sign includes the steps of:
subtracting the maximum modulating signal from the DC voltage value to generate a high gain zero sequence magnitude signal; and
multiplying the high gain zero sequence magnitude signal by the zero sequence sign.

29. The method of claim 10 wherein the step of providing a low loss signal set includes identifying a low loss zero sequence signal and mathematically combining each of the initial modulating signals with the low loss zero sequence signal and the step of identifying a high gain zero sequence signal includes the steps of:
phase shifting the initial signals by a specified phase angle to generate first, second and third phase shifted signals;
identifying the instantaneous maximum phase shifted signal;
correlating one of the initial modulating signals with the maximum phase shifted signal, the correlated initial modulating signal being a correlated signal;
determining the instantaneous sign of the correlated signal as the low loss zero sequence sign; and
mathematically combining the correlated signal, the DC bus voltage and the low loss zero sequence sign to generate the low loss zero sequence signal.

30. The method of claim 29 wherein the step of mathematically combining the correlated signal, the DC bus voltage and the low loss zero sequence sign includes the steps of:
subtracting the correlated signal from the DC voltage value to generate a low loss zero sequence magnitude signal; and
multiplying the low loss zero sequence magnitude signal by the low loss zero sequence sign.

31. The method of claim 29 wherein the specified phase angle is 30 degrees.

32. The method of claim 26 wherein the first threshold index is substantially 0.65 and the second threshold index is substantially 0.91.

33. The method of claim 26 wherein the controller provides at least one current signal indicating the phase of a current associated with a first of the initial modulating signals, to generate the low loss zero sequence signal, the method further including the steps of:
using the current signal and the first initial modulating signal to identify the phase angle between the current signal and first initial modulating signal;
generating first second and third phase shifted signals by phase shifting the initial signals by the phase angle;

identifying the instantaneous maximum phase shifted signal;

correlating one of the initial modulating signals with the maximum phase shifted signal, the correlated initial modulating signal being a correlated signal;

determining the instantaneous sign of the correlated signal as the low loss zero sequence sign; and mathematically combining the correlated signal, the DC bus voltage and the low loss zero sequence sign to generate the low loss zero sequence signal.

34. The method of claim 33 wherein the step of mathematically combining the correlated signal, the DC bus voltage and the low loss zero sequence sign includes the steps of:

subtracting the correlated signal from the DC bus voltage value to generate a low loss zero sequence magnitude signal; and multiplying the low loss zero sequence signal by the low loss zero sequence sign.

* * * * *